(12) United States Patent
Tsuruhara et al.

(10) Patent No.: US 6,399,681 B1
(45) Date of Patent: Jun. 4, 2002

(54) COLORED THERMOPLASTIC RESIN COMPOSITION AND RELATED ARTS THEREOF

(75) Inventors: Tohru Tsuruhara, Kadoma; Akihiko Hayashi, Osaka; Hiroshi Takeuchi, Kadoma, all of (JP)

(73) Assignee: Orient Chemical Industries, Ltd. (JP)

( * ) Notice: Subject to any disclaimer, the term of this patent is extended or adjusted under 35 U.S.C. 154(b) by 0 days.

(21) Appl. No.: 09/830,937

(22) PCT Filed: Oct. 27, 1999

(86) PCT No.: PCT/JP99/05926

§ 371 (c)(1),
(2), (4) Date: May 2, 2001

(87) PCT Pub. No.: WO00/26302

PCT Pub. Date: May 11, 2000

(30) Foreign Application Priority Data

Nov. 2, 1998 (JP) ............................................. 10-327519

(51) Int. Cl.⁷ ........................ C08K 5/346; C08K 5/521; C08K 5/41; C08K 5/101

(52) U.S. Cl. ........................ 524/89; 524/127; 524/156; 524/157; 524/284

(58) Field of Search .......................... 524/89, 127, 156, 524/157, 284

(56) References Cited

U.S. PATENT DOCUMENTS

| 4,518,728 A | 5/1985 | Pollard |
| 5,350,792 A | 9/1994 | Hess et al. |
| 5,827,911 A | 10/1998 | Hayashi et al. |
| 5,956,653 A | 9/1999 | Masatake et al. |

FOREIGN PATENT DOCUMENTS

| EP | 0 052 944 A1 | 6/1982 |
| EP | 0 803 780 A1 | 10/1997 |
| EP | 0 861 871 A1 | 9/1998 |
| JP | 57115454 | 7/1982 |
| JP | 6043379 | 9/1985 |
| JP | 60226551 | 11/1985 |
| JP | 146524 | 10/1989 |
| JP | 2117951 | 5/1990 |
| JP | 350263 | 3/1991 |
| JP | 5186633 | 7/1993 |
| JP | 5194825 | 8/1993 |
| JP | 5230278 | 9/1993 |
| JP | 6128479 | 5/1994 |
| JP | 853610 | 2/1996 |
| JP | 10161352 | 6/1998 |
| JP | 10237280 | 9/1998 |
| JP | 10324807 | 12/1998 |

Primary Examiner—Kriellion A. Sanders
(74) Attorney, Agent, or Firm—McGlew and Tuttle, P.C.

(57) ABSTRACT

A colored thermoplastic resin composition comprising a crystalline thermoplastic resin containing a black dye or a black dye and a fibrous reinforcing material, wherein said black dye is a black dye obtainable by a reaction of one or more anionic surfactants selected from the group consisting of (a) to (d) below and nigrosine, and wherein the crystallizing temperature is lower than that of the original thermoplastic resin containing no black dye, (a) a sulfuric acid ester surfactant
(b) a phosphoric acid ester surfactant
(c) a sulfonic acid surfactant
(d) a carboxylic acid surfactant.

15 Claims, 5 Drawing Sheets

COLORED THERMOPLASTIC RESIN COMPOSITION AND RELATED ARTS THEREOF

FIELD OF THE INVENTION

The present invention relates to a colored thermoplastic resin composition containing a black dye exhibiting excellent dispersibility and/or compatibility for a crystalline thermoplastic resin, a method for molding said colored thermoplastic resin composition, a method for lowering the crystallizing temperature of a thermoplastic resin, and a fiber-reinforced colored thermoplastic resin molded product.

BACKGROUND OF THE INVENTION

Being excellent in mechanical and chemical properties, thermoplastic resins are widely used for molded plastic products in the field of parts of automobiles, electric and electronic products, etc., and their demand is increasing in the field of engineering plastics as well.

As such, thermoplastic resins are colored for decoration, color identification, improvement of light fastness of molded products, content protection and shading and for other purposes; in particular, black coloring is the most important for industrial applications. Traditionally, various inorganic pigments and organic dyes/pigments, such as carbon black, black metal complex dyes, azine dyes and perinone black, have been used for black coloring of thermoplastic resins.

More specifically, examples of colored thermoplastic resins include a molding formula comprising a polyamide resin colored with carbon black and nigrosine (Japanese Patent Examined Publication no.43379/1985); a molding composition comprising a polyamide resin colored with carbon black and a copper phthalocyanine pigment (Japanese Patent Unexamined Publication No. 226551/1985); a molding composition comprising an unsaturated polyester resin colored with aniline black and solvent blue (Japanese Patent Examined Publication No. 46524/1989); a plastic molding composition comprising a thermoplastic resin supplemented with carbon black and titanium oxide (Japanese Patent Unexamined Publication No. 186633/1993); a colored resin composition comprising a thermoplastic resin colored with a red organic pigment, a blue organic pigment and a yellow organic pigment (Japanese Patent Unexamined Publication No.230278/1993); and a mixed resin of polyethylene terephthalate resin and polybutylene terephthalate resin with carbon black dispersed therein (Japanese Patent Unexamined Publication No. 194825/1993).

However, these conventional colored thermoplastic resin compositions do not always have good appearance and surface gloss, many of which undergo physical property deterioration in comparison with the original thermoplastic resins; further investigation remains to be conducted.

In addition, there have been attempts to improve the heat resistance and chemical resistance of thermoplastic resins and confer mechanical characteristics suited for various uses, by formulating a fibrous reinforcing material therein, to meet the requirements of a wide variety of industrial applications. Furthermore, in recent years, there has been a marked trend toward replacement of conventional metal parts of electronic products, electrical equipment for automobiles, etc. with fiber-reinforced thermoplastic resins, for the purpose of weight reduction, manufacturing process simplification and corrosion prevention, taking note of the good physical properties of fiber-reinforced crystalline thermoplastic resins as molding materials.

Examples of conventional fiber-reinforced colored thermoplastic resins include a polyester resin composition for molding comprising a polybutylene terephthalate having a specific viscosity of not less than 0.35, a reinforcing material and carbon black (Japanese Patent Unexamined Publication No. 117951/1990); a thermoplastic resin composition comprising a thermoplastic resin, a modified polyolefin, a fibrous reinforcing material and carbon black (Japanese Patent Unexamined Publication No. 50263/1991); a glass fiber-reinforced black polyamide resin composition comprising a polyamide resin, surface-treated glass fiber and an azine dye (Japanese Patent Unexamined Publication No. 128479/1994); and an antistatic-fiber-reinforced polybutylene terephthalate resin composition comprising a glass fiber-reinforced polybutylene terephthalate resin having a volume resistivity of not more than $1 \times 10^{10}$ Ωcm, and carbon black formulated therein (Japanese Patent Unexamined Publication No. 53610/1996).

In conventional fiber-reinforced colored thermoplastic resins, however, the problem is likely to arise in which it is difficult to thoroughly and uniformly disperse a coloring agent (e.g., black pigment) in the resin even by kneading them together for a long time, because of the presence of a fibrous reinforcing material in the resin. In addition, adding a coloring agent can deteriorate the physical properties, can intensify the warpage deformation of the molded product due to a temperature change during molding, or can considerably reduce the fluidity, in comparison with the original thermoplastic resin which does not contain the coloring agent. In particular, the flotation of the fibrous reinforcing material on the surface of the molded product during molding is somewhat problematic in that the gloss, appearance, etc. of the colored molded product are affected.

For these reasons, there is a strong commercial demand for a fiber-reinforced colored thermoplastic resin which is moldable at high precision for details, which has good light fastness, and which exhibits better gloss and appearance in the markets of various molded products etc.

In addition, injection molding, a method for molding a thermoplastic resin, is a method wherein a plastic material, previously fluidized by heating, is injected into the hollow (cavity) of a mold and cooled and solidified in the mold to yield a molded product fitting to the inside shape of the cavity, making it possible to obtain products of high precision and high quality with highest efficiency and productivity.

In this case, the temperature of the mold governs the cooling solidification conditions for the molten resin filled in the mold. Specifically, as the difference from the resin temperature increases (mold temperature decreases), the cooling rate increases. In the case of a crystalline material, in particular, there is a remarkably high correlation between cooling rate and degree of crystallinity, and the degree of crystallinity significantly affects the physical property values of the molded product.

Regarding the general tendency, as the mold temperature decreases, the degree of crystallinity decreases and the molded product becomes more ductile. As the mold temperature increases, the degree of crystallinity increases and the strength of the molded product becomes higher but the molded product becomes more brittle.

Injection time in injection molding refers to the period of time during which a thermoplastic resin is inject-filled in the cavity. In the case of a thin molded product, injection time shortens. As the molded product becomes larger, more complex, and thicker, more injection time is taken. It is therefore possible to mold a more complex molded product by broadening the range of optimum injection time for a thermoplastic resin.

In molding treatment of a thermoplastic resin, the temperature at which the material is thermally plasticized varies over a wide range from about 180 to 430° C., including the temperature of the heating cylinder. In addition, molding temperature, i.e., the temperature required to cool and harden the material, refers to the temperature of the mold, and normally ranges from about 120 to 200° C. Causes of molding failures in the injection molding process include uneven coloring, sinks, short shots, and burned marks. These are caused by high mold temperatures and uneven cooling circuits. The flow mark is known to be a molding failure and to be prevented by increasing the mold temperature. If the mold temperature is increased, however, additional heat energy is required; in addition, a great amount of heat energy must be transferred to cool the once-heated mold; these factors raise production cost. Furthermore, if the mold temperature is increased, a greater amount of gas is generated; the surface of the molded product becomes likely to have clouding (haze) due to gas adhesion, which in turn makes it difficult to obtain a molded product of high gloss.

The present invention was developed in view of the above problems in the prior art. Accordingly, the object of the invention is to provide a colored thermoplastic resin composition which can be molded at low mold temperatures, which is capable of producing a fiber-reinforced or non-fiber-reinforced molded product with improved surface gloss, which has been colored vividly without affecting the characteristics of the original thermoplastic resin, which is good in appearance, surface shape and light fastness, and a method for molding said colored thermoplastic resin composition, a method for lowering the crystallizing temperature of a thermoplastic resin, and a fiber-reinforced colored thermoplastic resin molded product.

SUMMARY AND OBJECT OF THE INVENTION (1) The colored thermoplastic resin composition of the present invention for accomplishing the above object is a colored thermoplastic resin composition comprising a crystalline thermoplastic resin containing a black dye, wherein said black dye is a black dye obtainable by a reaction of one or more anionic surfactants selected from the group consisting of (a) to (d) below and nigrosine, and wherein the crystallizing temperature is lower than that of the original thermoplastic resin containing no black dye.

(a) a sulfuric acid ester surfactant (b) a phosphoric acid ester surfactant (c) a sulfonic acid surfactant (d) a carboxylic acid surfactant Accordingly, the present inventors found that when a black dye obtainable by a reaction of one or more anionic surfactants selected from the group consisting of (a) a sulfuric acid ester surfactant, (b) a phosphoric acid ester surfactant, (c) a sulfonic acid surfactant and (d) a carboxylic acid surfactant, and nigrosine, is formulated in a crystalline thermoplastic resin to color the thermoplastic resin, the dispersibility and/or compatibility of the black dye for the thermoplastic resin is excellent, the black dye in the thermoplastic resin undergoes almost no fading or discoloration during blending, kneading and molding, a uniformly and vividly colored molded product with good surface gloss is obtained, and molding treatment can be smoothly carried out without affecting the fluidity of the thermoplastic resin; and that the light fastness of the molded product is good, the mechanical properties of the molded product are good and are hardly deteriorated by coloring, it is possible to lower the crystallizing temperature of a crystalline thermoplastic resin so that the mold temperature during molding can be set at a low level, the cost for heating the mold and the cost for cooling the mold if necessary are lowered, and a molded product of excellent appearance and high surface gloss is obtained. The present inventors developed the present invention based on this finding.

(1-1) The aforementioned sulfuric acid ester surfactant may be one or more surfactants selected from the group consisting of an alkyl sulfuric acid ester or a salt thereof, an alkyl ether sulfuric acid ester or a salt thereof, a polyoxyethylene ether sulfuric acid ester or a salt thereof, a polyoxyethylene alkyl ether sulfuric acid ester or a salt thereof, a polyoxyethylene aryl ether sulfuric acid ester or a salt thereof, and an alkylamide sulfuric acid ester or a salt thereof.

(1-2) The aforementioned phosphoric acid ester surfactant may be one or more surfactants selected from the group consisting of an alkyl phosphoric acid ester or a salt thereof, a polyoxyethylene ether phosphoric acid ester or a salt thereof, a polyoxyethylene alkyl ether phosphoric acid ester or a salt thereof, and a polyoxyethylene aryl ether phosphoric acid ester or a salt thereof.

(1-3) The aforementioned sulfonic acid surfactant may be one or more surfactants selected from the group consisting of an alkylbenzenesulfonic acid or a salt thereof, an alkylnaphthalenesulfonic acid or a salt thereof, a naphthalenesulfonic acid salt-formalin polycondensation product, a sulfosuccinic acid or a salt thereof, α-olefinsulfonic acid or a salt thereof, and N-acylsulfonic acid or a salt thereof.

(1-4) The aforementioned carboxylic acid surfactant may be one or more surfactants selected from the group consisting of a polyoxyethylene ether carboxylic acid or a salt thereof, a polyoxyethylene alkyl ether carboxylic acid or a salt thereof, an N-acylamino acid or a salt thereof, a naphthenic acid or a salt thereof, an aliphatic amine and aliphatic amide fatty acid or a salt thereof, an aliphatic amine and aliphatic amide aromatic carboxylic acid or a salt thereof, and a polycarboxylic acid type high molecular compound or a salt thereof.

(1-5) The colored thermoplastic resin composition of (1), (1-1), (1-2), (1-3) or (1-4) may be one wherein said black dye is contained at 0.1 to 10% by weight per 100% by weight of the thermoplastic resin.

(1-6) The colored thermoplastic resin composition of (1), (1-1), (1-2), (1-3), (1-4) or (1-5) may have a crystallizing temperature lower by not less than 5° C. than that of a thermoplastic resin composition containing nigrosine instead of said black dye.

(1-7) The colored thermoplastic resin composition of (1), (1-1), (1-2), (1-3), (1-4) or (1-5) may have a crystallizing temperature lower by not less than 10° C. than that of the original thermoplastic resin composition not containing said black dye.

(1-8) The colored thermoplastic resin composition of (1), (1-1), (1-2), (1-3), (1-4) or (1-5) may have a crystallizing temperature lower by not less than 15° C. than that of the original thermoplastic resin composition not containing said black dye.

(1-9) The colored thermoplastic resin composition of (1), (1-1), (1-2), (1-3), (1-4) or (1-5), (1-6), (1-7) or (1-8) is preferably one wherein said crystalline thermoplastic resin is polyamide resin, polybutylene terephthalate resin or polyphenylene sulfide resin.

(1-10) The colored thermoplastic resin composition of (1), (1-1), (1-2), (1-3), (1-4), (1-5), (1-6), (1-7), (1-8) or (1-9) is preferably one containing a fibrous reinforcing material.

(2) The method of the present invention for lowering the crystallizing temperature of a thermoplastic resin is a method for lowering the crystallizing temperature, in comparison with the original thermoplastic resin containing no black dye, by containing a black dye in a crystalline thermoplastic resin, wherein said black dye is a black dye obtainable by a reaction of one or more anionic surfactants selected from the group consisting of (a) to (d) below and nigrosine.

(a) a sulfuric acid ester surfactant (b) a phosphoric acid ester surfactant (c) a sulfonic acid surfactant (d) a carboxylic acid surfactant (3) The method of the present invention for molding a colored thermoplastic resin composition comprises injection-molding the colored thermoplastic resin composition of (1), (1-1), (1-2), (1-3), (1-4), (1-5), (1-6), (1-7), (1-8), (1-9) or (1-10) at mold temperature of 50 to 120° C.

(4) The fiber-reinforced colored thermoplastic resin molded product of the present invention is a fiber-reinforced colored thermoplastic resin molded product comprising a crystalline thermoplastic resin containing a fibrous reinforcing material and a black dye, wherein said black dye is a black dye obtainable by a reaction of one or more anionic surfactants selected from the group consisting of (a) to (d) below and nigrosine, and whose surface glossiness is higher than that of a fiber-reinforced colored thermoplastic resin molded product containing nigrosine instead of said black dye.

(a) a sulfuric acid ester surfactant (b) a phosphoric acid ester surfactant (c) a sulfonic acid surfactant (d) a carboxylic acid surfactant The black dye in the present invention surpasses nigrosine and black pigments, which have traditionally been used for coloring thermoplastic resins, in terms of dispersibility and/or compatibility for crystalline thermoplastic resins. With this feature, the black dye of the present invention is capable of more uniformly black coloring a crystalline thermoplastic resin even when the dry color method is used. This uniform coloring effect is particularly remarkable in a colored thermoplastic resin composition containing a fibrous reinforcing material, in which coloring agents are unlikely to become dispersed due to the influence of the fibrous reinforcing material.

The colored thermoplastic resin composition of the present invention is stable and unlikely to undergo fading and discoloration even in the heating processes such as extrusion, pellet drying before molding, and molding, and is capable of forming a uniformly colored molded product. In addition, the colored thermoplastic resin composition of the present invention is also suited for a molded product requiring high light fastness, such as a molded product to be kept outdoors or elsewhere.

The colored thermoplastic resin composition of the present invention, which possesses crystallinity, has its crystallizing temperature lowered (by not less than 10° C., for example), in comparison with the original thermoplastic resin not containing said black dye, by containing the black dye described above. Crystallizing temperature reduction is particularly remarkable in polyamide resin. On the basis of this crystallizing temperature reduction, the molding temperature for the resin composition of the present invention can be set at a low level. For this reason, it is easily possible to reduce molding cost and suppress molding failures. In addition, because the shrinkage of the molded product upon cooling during molding is decreased, molding precision improves so that the anisotropy of molded product strength can be well reduced; it is therefore possible to obtain a molded product which is excellent in surface gloss (for further increased surface gloss, the crystallizing temperature reduction is preferably not less than 15° C., rather than 10° C.), appearance and dimensional stability during heating. Regarding the obtainment of a molded product with excellent surface gloss and appearance, this effect is remarkable in the case of a colored thermoplastic resin composition containing a fibrous reinforcing material, which tends to have the fibrous reinforcing material floating on the surface of the molded product.

In addition, the colored thermoplastic resin composition of the present invention, which possesses crystallinity, has a crystallizing temperature lower (by not less than 5° C., for example) than that of a crystalline thermoplastic resin composition colored with a black pigment (e.g., carbon black) or conventional nigrosine. For this reason, molding precision is improved and fine ruggedness is unlikely to occur on the surface of the molded product, in comparison with a crystalline thermoplastic resin composition colored with conventional nigrosine or a black pigment such as carbon black, so that a molded product with good appearance and gloss is obtained. This difference is conspicuous in polyamide resin and polybutylene terephthalate resin.

Furthermore, the colored thermoplastic resin composition of the present invention makes it possible to adjust the degree of crystallinity of a crystalline resin composition in a molded product over a desired range, because the allowance for adjustment of mold temperature and injection time in injection molding is broadened as a result of the reduction in crystallizing temperature. By optimally setting mold temperature and injection time, it is possible to improve the surface gloss of a molded product and to suppress its reduction. To obtain a molded product with still better surface gloss, mold temperature can be set at 50° C. to 120° C., preferably 70° C. to 105° C., when polyamide resin, for example, is used. As a result, the molded product has the best surface gloss.

Therefore, the colored thermoplastic resin composition of the present invention exhibits the capability of being uniformly colored because the black dye contained as a coloring agent therein is good in dispersibility and solubility in the crystalline resin, and this effect is remarkable in a colored thermoplastic resin composition containing a fibrous reinforcing material. In addition, because the black dye has excellent light fastness, the fading rate is slow and the color hue hardly changes during fading.

Also, many of the additives used to provide various functions for crystalline thermoplastic resins act to raise their crystallizing temperature or lower the surface gloss and appearance of molded products. In contrast, even when such additives are contained, the colored thermoplastic resin composition of the present invention has its crystallizing temperature lowered by the black dye contained as a coloring agent therein, and the gloss and appearance of the molded product are improved.

Because the colored thermoplastic resin composition of the present invention has its crystallizing temperature lowered (by not less than 10° C., for example), in comparison with the original thermoplastic resin not containing said black dye as a coloring agent, the temperature of the mold for molding can be lowered. Because the shrinkage of the molded product upon cooling is decreased by conducting molding at a reduced mold temperature, molding precision improves so that the anisotropy of molded product strength can be well reduced and dimensional stability during heating is excellent. For this reason, the composition of the present invention is quite effective in producing a precisely molded product, which undergoes rigorous requirements of dimensional precision. In addition, because the temperature of the mold for molding can be lowered, the cooling solidification time for the molded product can be shortened and the equipment cost for the mold heater can be saved, so that a large molded product can be obtained using relatively small equipment.

In addition, according to the method of the present invention for lowering the crystallizing temperature of a thermoplastic resin, it is possible to lower the crystallizing temperature (not less than 10° C., for example), in comparison with the original thermoplastic resin containing no black dye, by containing the black dye in a crystalline thermoplastic resin.

Furthermore, according to the method of the present invention for molding a colored thermoplastic resin composition, because the shrinkage of the molded product upon cooling is decreased, molding precision improves so that the anisotropy of molded product strength is well reduced and dimensional stability during heating is excellent; it is possible to efficiently produce a precisely molded product, which undergoes rigorous requirements of dimensional precision. In addition, the cooling solidification time for the molded product can be shortened and the equipment cost for the mold heater can be saved, so that a large molded product can be obtained using relatively small equipment.

Furthermore, the fiber-reinforced colored thermoplastic resin molded product of the present invention has excellent gloss and appearance and exhibits the capability of being uniformly colored, and because the black dye contained as a coloring agent therein has excellent light fastness, the fading rate is slow and the color hue hardly changes during fading.

DESCRIPTION OF THE PREFERRED EMBODIMENT

Figure 1:
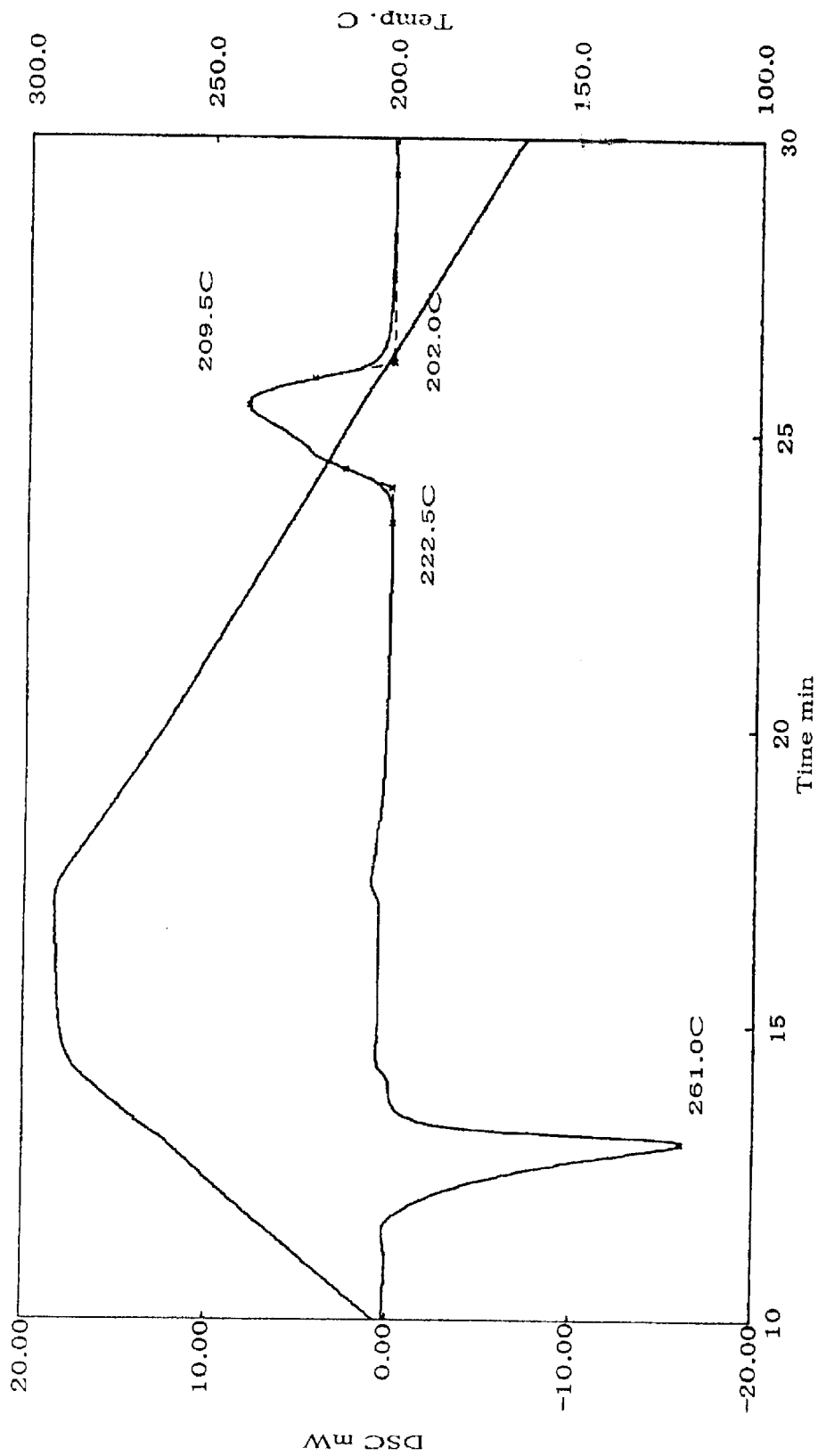
FIG. 1 shows a DSC curve obtained in Example 6.

The description below applies to both non-fiber-reinforced thermoplastic resins and fiber-reinforced thermoplastic resins, except in cases where the two are distinguished from each other.

As a nigrosine which can be used as a starting material for the black dye in the present invention, there may be mentioned black azine condensed mixtures like those described in the COLOR INDEX as C.I. SOLVENT BLACK 5 or C.I. SOLVENT BLACK 7. Synthesis of such nigrosine can, for example, be achieved by oxidizing and dehydrate-condensing aniline, aniline hydrochloride and nitrobenzene in the presence of iron chloride at a reaction temperature of 160 to 180. Nigrosine is produced as a mixture of various different compounds, depending on reaction conditions, charged materials and charging ratio, and is assumed to be a mixture of various triphenazineoxazines of Formula (I) or (II) below and phenazineazine compounds of Formulas (III) through (VI).

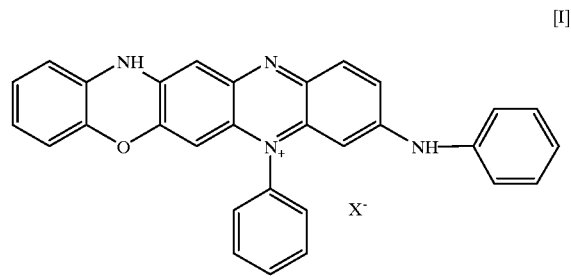

[I]

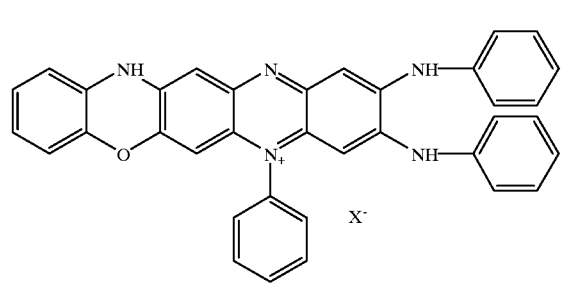

[II]

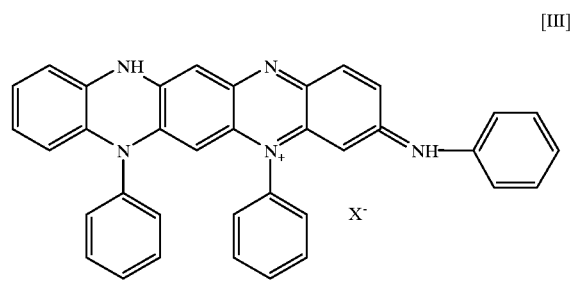

[III]

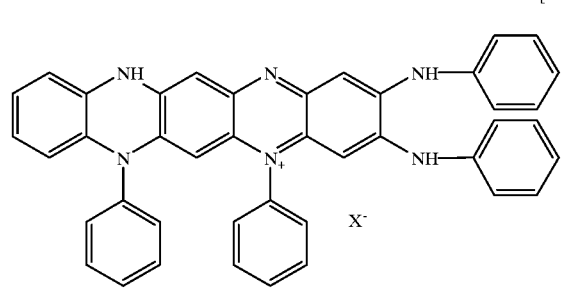

[IV]

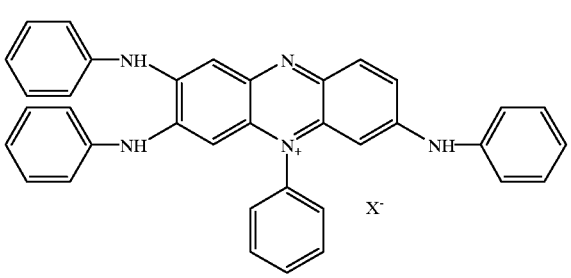

[V]

-continued

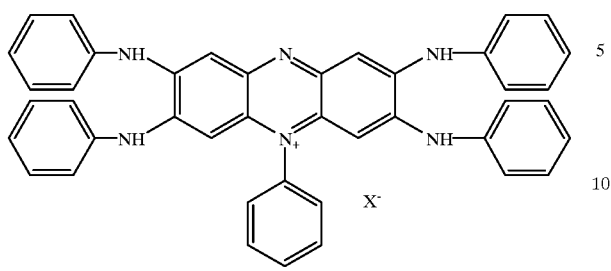

[VI]

[In Formulas (I) through (VI), X represents Cl or OH.]

Examples of commercially available nigrosine products which serve as starting materials for the black dye in the present invention include Spirit Black SB, Spirit Black AB, etc. (nigrosines classified under C.I. SOLVENT BLACK 5); and Nigrosine Base SA, Nigrosine Base EE, Nigrosine Base EX, Nigrosine Base EX-BP, etc. (nigrosines classified under C.I. SOLVENT BLACK 7) [all trade names for nigrosines produced by Orient Chemical Industries Ltd.].

The black dye used for the present invention is obtainable by a reaction of conventional nigrosine and one or more anionic surfactants selected from the group consisting of (a) a sulfuric acid ester surfactant, (b) a phosphoric acid ester surfactant, (c) a sulfonic acid surfactant and (d) a carboxylic acid surfactant. This reaction may be a reaction of one of these anionic surfactants and nigrosine, and may be a reaction of two or more of these anionic surfactants and nigrosine. In addition, the colored thermoplastic resin composition and fiber-reinforced colored thermoplastic resin molded product of the present invention may contain a portion of nigrosine unreacted with anionic surfactants, as well as the aforementioned black dye.

Examples of the aforementioned anionic surfactants (a) to (d) are given below.
- (a) The sulfuric acid ester surfactant is exemplified by
   an alkyl sulfuric acid ester or a salt thereof,
   an alkyl ether sulfuric acid ester or a salt thereof,
   a polyoxyethylene ether sulfuric acid ester or a salt thereof,
   a polyoxyethylene alkyl ether sulfuric acid ester or a salt thereof,
   a polyoxyethylene aryl ether sulfuric acid ester or a salt thereof, and
   an alkylamide sulfuric acid ester or a salt thereof.
- (b) The phosphoric acid ester surfactant is exemplified by
   an alkyl phosphoric acid ester or a salt thereof,
   a polyoxyethylene ether phosphoric acid ester or a salt thereof,
   a polyoxyethylene alkyl ether phosphoric acid ester or a salt thereof, and
   a polyoxyethylene aryl ether phosphoric acid ester or a salt thereof.
- (c) The sulfonic acid surfactant is exemplified by
   an alkylbenzenesulfonic acid or a salt thereof,
   an alkylnaphthalenesulfonic acid or a salt thereof,
   a naphthalenesulfonic acid salt-formalin polycondensation product,
   a sulfosuccinic acid or a salt thereof,
   α-olefinsulfonic acid or a salt thereof, and
   N-acylsulfonic acid or a salt thereof.
- (d) The carboxylic acid surfactant is exemplified by
   a polyoxyethylene ether carboxylic acid or a salt thereof,
   a polyoxyethylene alkyl ether carboxylic acid or a salt thereof,
   an N-acylamino acid or a salt thereof,
   a naphthenic acid or a salt thereof,
   an aliphatic amine and aliphatic amide fatty acid or a salt thereof,
   an aliphatic amine and aliphatic amide aromatic carboxylic acid or a salt thereof, and
   a polycarboxylic acid type high molecular compound or a salt thereof.

The black dye in the present invention can be produced by an ionic reaction of conventional nigrosine and one or more anionic surfactants selected from the group consisting of (a) to (d) above. Any commonly known production method or other method can be used to produce the black dye in the present invention, as long as conventional nigrosine and said anionic surfactants are reacted. The reaction can be carried out both in an aqueous system and in a non-aqueous system (organic solvent system).

The thus-obtained black dye in the present invention has been confirmed as distinct from the starting material nigrosine by TLC and IR spectrum.

The charged molar ratio of nigrosine to said anionic surfactants in the production process for the black dye in the present invention is preferably 0.1 to 1.5 mol of anionic surfactants per 1 mol of nigrosine, on the assumption of a putative molecular weight of 600 for nigrosine. If this ratio is under 0.1 mol, the improving effect on dispersibility and compatibility for thermoplastic resin tends to weaken. If this ratio exceeds 1.5 mol, the resulting black dye tends to melt and to be difficult to take out as a crystal. This ratio is particularly preferably 0.5 to 1.0 mol.

The black dye in the present invention increases its solubility in organic solvents as the amount of anionic surfactants relative to the starting material nigrosine increases, whereby the dispersibility and compatibility for thermoplastic resin in the formulation and molding processes is believed to improve.

The amount of black dye used in the colored thermoplastic resin composition of the present invention may, for example, be 0.01 to 15% by weight relative to the thermoplastic resin in the case of ordinary resin coloring (low-color-density molded products). This content is preferably 0.1 to 10% by weight, more preferably 0.5 to 5% by weight. For sufficiently lowering the crystallizing temperature, the content is particularly preferably 1 to 5% by weight. In the case of masterbatches (high-color-density molded products), the amount of coloring agent used may be 20 to 50% by weight relative to the thermoplastic resin, and is preferably 20 to 35% by weight.

Examples of the crystalline thermoplastic resin in the colored thermoplastic resin composition of the present invention include polyamide resin, polyethylene resin, polypropylene resin, polybutylene terephthalate resin, polyphenylene sulfide resin and polyether ether ketone resin. Of these thermoplastic resins, polyamide resin, polybutylene terephthalate resin and polyphenylene sulfide resin are preferred. These thermoplastic resins may be used singly or in combination of two or more species. In addition, there may be mentioned copolymers or mixtures comprising mainly of these polymers; thermoplastic resins prepared by formulating an elastomer such as rubber or rubber-like resin therein; and polymer alloys containing not less than 10% by weight of these resins.

Examples of polyamide resins which can be used for the present invention include nylon 6, nylon 66, nylon 46, nylon 11, nylon 12, nylon 69, nylon 610, nylon 612, nylon 96, nylon MIX 6, and copolymers of two or more thereof, such as nylon 6/66 copolymer, nylon 6/66/610 copolymer, and nylon 6/66/11/12 copolymer. These polyamide resins maybe used singly or in combination of two or more species.

The polybutylene terephthalate resin which can be used for the present invention is a polyester resin obtained from an aromatic dicarboxylic acid (mainly terephthalic acid) or an ester thereof and a glycol (mainly 1,4-butanediol) as the major starting materials, and contains in its molecular structure a large number of butylene terephthalate repeat units. Suited for the present invention is polybutylene terephthalate resin having at least 60 mol % of butylene terephthalate repeat units, preferably polybutylene terephthalate resin having not less than 80 mol %, more preferably not less than 90 mol % of butylene terephthalate repeat units. The polybutylene terephthalate resin for the present invention may be a polymer alloy of polybutylene terephthalate resin and another synthetic resin. Examples of such polymer alloys include polybutylene terephthalate/polycarbonate alloy, polybutylene terephthalate/polyamide alloy, polybutylene terephthalate/ABS (acrylonitrile-butadiene-styrene copolymer resin) alloy, polybutylene terephthalate/polypropylene alloy and polybutylene terephthalate/polyphenylene ether alloy. These polybutylene terephthalate resins (including polymer alloys) may be used singly or in combination of two or more species.

The colored thermoplastic resin composition of the present invention may contain appropriate amounts of various fibrous reinforcing materials according to its use and purpose. Any fibrous reinforcing material can be used for the colored thermoplastic resin composition and fiber-reinforced colored thermoplastic resin molded product of the present invention, as long as it can be used to reinforce conventional synthetic resins. Examples of such fibrous reinforcing materials include glass fiber, carbon fiber and various organic fibers. In the case of glass fiber, for example, its content is preferably set at 5 to 120% by weight relative to 100% by weight of the crystalline thermoplastic resin. If the glass fiber content is under 5% by weight, satisfactory reinforcing effect is difficult to achieve with the glass fiber; if the glass fiber content exceeds 120% by weight, the moldability tends to decrease. The glass fiber content is preferably 10 to 60% by weight, particularly preferably 20 to 50% by weight.

The colored thermoplastic resin composition and fiber-reinforced colored thermoplastic resin molded product of the present invention may be formulated with various commonly known additives to confer desired characteristics according to the objective. Examples of such additives include auxiliary colorants, dispersing agents, fillers, stabilizers, plasticizers, modifiers, ultraviolet absorbents or light stabilizers, antioxidants, antistatic agents, flame retardants and elastomers for improved impact resistance.

Auxiliary colorants include, for example, inorganic pigments, organic pigments or organic dyes used in small amounts to enhance the coloring power, to improve the heat resistance and light fastness, or to adjust the color tone.

Examples of modifiers include silicon compounds such as amino-modified silicone oil and alkyl-modified silicone oil, and waxes.

Examples of ultraviolet absorbents or light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retardants include halogen-containing compounds such as tetrabromobisphenol A derivatives, hexabromodiphenyl ether and tetrabromophthalic anhydride; phosphorus-containing compounds such as triphenyl phosphate, triphenyl phosphite, red phosphorus and ammonium polyphosphate; nitrogen-containing compounds such as urea and guanidine; silicon-containing compounds such as silicone oil, organic silane and aluminum silicate; and antimony compounds such as antimony trioxide and antimony phosphate.

Examples of inorganic fillers include glass flake, glass beads, silica, quartz, amorphous silicic acid, talc, magnesium carbonate, calcium carbonate, alumina, metal powder, kaolin, calcium silicate, mica and wollastonite.

The colored thermoplastic resin composition of the present invention can be prepared by formulating the starting materials by an optionally chosen method of formulation. Normally, it is preferable to mix these components as uniformly as possible. For example, a colored thermoplastic resin composition can be prepared by uniformly mixing all starting materials in a mechanical mixer such as a blender, a kneader, a Banbury mixer, a roll or an extruder. Alternatively, it can be obtained by mixing some starting materials in a mechanical mixer, and subsequently adding the remaining components and uniformly mixing them. It can also be obtained as colored grains (colored pellets) by kneading the starting materials, previously blended in a dry state, in a molten state using a heated extruder, to obtain a uniform mixture, extruding the mixture into a needle form, and subsequently cutting it into pieces of desired length.

In addition, a master batch of the colored thermoplastic resin composition of the present invention can be obtained by an optionally chosen method. For example, it can be obtained by mixing a crystalline thermoplastic resin as the master batch base, in a powder or pellet form, and coloring agents in a mechanical mixer such as a tumbler or a super-mixer, pelletizing or coarsely granulating the mixture by the hot melt method using an extruder, a batch kneader, a roll kneader, or the like. A master batch can also be obtained by adding coloring agents to a thermoplastic resin for master batch remaining in a molten state after synthesis, then removing the solvent.

The colored thermoplastic resin composition of the present invention can be molded by various procedures in common use. For example, it can be molded from colored pellets using a molding machine such as an extruder, an injection molding machine or a roll mill. In addition, it can be molded by mixing in an appropriate mixer a thermoplastic resin, in a pellet or powder form, pulverized coloring agents, and various additives used as necessary, and molding this mixture using a molding machine. It is also possible to add a coloring agent to a monomer containing an appropriate polymerization catalyst, polymerize this mixture into a desired crystalline thermoplastic resin, and mold this resin by an appropriate method. Molding can be achieved by any molding methods in common use, including injection molding, extrusion molding, compression molding, foaming, blow molding, vacuum molding, injection blow molding, rotational molding, calendering and solution casting.

EXAMPLES

The present invention is hereinafter described in more detail by means of the following examples, which are not to be construed as limitative.

Production Examples 1 through 13 concern the production of the black dye in the present invention by a reaction of conventional nigrosine and the anionic surfactant of (a) to (d) above.

Production Example 1
Example of Production of Black Dye
50 g of a polyoxyethylene aryl ether phosphoric acid ester (produced by Dai-ichi Kogyo Seiyaku Co., Ltd., trade name:

Plysurf AL) was dispersed in 1,000 g of water; 100 g of Spirint Black AB (trade name for a nigrosine produced by Orient Chemical Industries, Ltd.) was added. After this mixture was reacted at room temperature for 3 hours, the reaction product was collected by filtration; the cake filtered out was washed with water and dried to yield 143 g (yield 95%) of a black dye.

Production Examples 2 to 13
Examples of Production of Black Dyes

Black dyes were obtained in the same manner as in Production Example 1, except that the polyoxyethylene aryl ether phosphoric acid ester used in Production Example 1 was replaced with each compound (anionic surfactant) shown in Table 1. In Production Examples 5, 6, 7, 10 and 13, however, Spirit Black AB (trade name for nigrosine produced by Orient Chemical Industries Ltd.) was replaced with Spirit Black SB (trade name for nigrosine produced by Orient Chemical Industries Ltd.).

TABLE 1

| Production example number | Anionic surfactant | | | | Yield (g) |
|---|---|---|---|---|---|
| | Name of compound | Trade name Manufacturer | Active ingredient content | Amount (g) | |
| 2 | Polyoxyethylene alkyl ether phosphoric acid ester | Plysurf A217E Dai-ichi Kogyo Seiyaku Co., Ltd. | 99% W/W | 50 | 138 |
| 3 | Polyoxyethylene alkyl ether phosphoric acid ester | Plysurf A208S Dai-ichi Kogyo Seiyaku Co., Ltd. | 99% W/W | 50 | 145 |
| 4 | Polyoxyethylene alkyl ether sulfate sodium | Hitenol 325D Dai-ichi Kogyo Seiyaku Co., Ltd. | 25% W/W | 200 | 120 |
| 5 | Polyoxyethylene aryl ether phosphoric acid ester | Plysurf AL Dai-ichi Kogyo Seiyaku Co., Ltd. | 98% W/W | 51 | 130 |
| 6 | Sodium alkylbenzene sulfonate | Lipon LH-200 Lion Corporation | 96% W/W | 52 | 135 |
| 7 | Higher alcohol alkylsulfuric acid ester sodium | Monogen Y100 Dai-ichi Kogyo Seiyaku Co., Ltd. | 98% W/W | 51 | 126 |
| 8 | Higher alcohol alkylsulfuric acid ester sodium | Monogen Y100 Dai-ichi Kogyo Seiyaku Co., Ltd. | 98% W/W | 51 | 133 |
| 9 | Sodium dialkylsulfo succinate | Neocol YSK Dai-ichi Kogyo Seiyaku Co., Ltd. | 70% W/W | 71 | 142 |
| 10 | Sodium dialkylsulfo succinate | Neocol YW-C Dai-ichi Kogyo Seiyaku Co., Ltd. | 69% W/W | 72 | 140 |
| 11 | Triethanol amine lauryl sulfate | Pelex NB-L Kao Corporation | 35% W/W | 143 | 137 |
| 12 | Polycarboxylic acid surfactant | Demol EP Kao Corporation | 24% W/W | 208 | 134 |
| 13 | N-acylmethyl tauric acid salt | Lipotac TE-P Lion Corporation | 26% W/W | 192 | 122 |

Examples 1 through 18 and Comparative Examples 1 to 8 concern the black polyamide resin compositions containing no fibrous reinforcing material.

In Examples 1 through 5 and Comparative Examples 1 through 4, colored molded pieces [48×86×3 (mm)] were prepared and evaluated in terms of appearance and surface gloss.

Example 1

1000 g of a polyamide resin (produced by Dupont, trade name: Zytel 101L-NC10) and 30 g of the black dye of Production Example 1 were placed in a stainless steel tumbler and stirred vigorously for 20 minutes.

This mixture was kneaded in a molten state at 300° C. using a vent-type extruder (produced by Enpura Sangyo, trade name: E30SV) and treated by a conventional method to yield colored pellets, which were vacuum-dried at 120° C. for 6 hours.

After pellet drying, a test piece was prepared at 280° C. to 300° C. by an ordinary method using an injection molding machine (produced by Kawaguchi Tekko, trade name: KM-50C). A bluish black molded test piece with good compatibility between the resin and the dye [48×86×3 (mm)] was obtained. The results of evaluation and measurement of the appearance and surface gloss of this molded test piece are shown in Table 2.

Appearance (Visual Evaluation of Coloring Condition)

The test piece was examined visually under STANDARD LIGHT C (JIS L0804) to evaluate its coloring condition.

Evaluation Criteria for Coloring

⊚: Uniformly and vividly colored.

○: Uniformly colored.

Δ: Partially ununiformly colored.

x: Totally ununiformly colored.

Measuring Conditions for Surface Gloss

Surface gloss was measured in accordance with JIS K7105 using a glossmeter (HG-268, produced by Suga Test Instruments Ltd.) to determine 60° specular gloss.

Examples 2 Through 5

In the same manner as in Example 1, except that the black dye of Production Example 1 was replaced with each black dye shown in Table 2, a uniformly black molded test piece with good appearance and surface gloss [48×86×3 (mm)] was obtained. Appearance and surface gloss were evaluated in the same manner as in Example 1; the results are shown in Table 2.

Comparative Example 1

Using polyamide resin without the black dye of Production Example 1 (original resin), a molded test piece was prepared in the same manner as in Example 1. Appearance and surface gloss were evaluated in the same manner as in Example 1; the results are shown in Table 2.

Comparative Example 2

In the same manner as in Example 1, except that the black dye of Production Example 1 was replaced with Spirit Black AB (trade name for nigrosine produced by Orient Chemical Industries Ltd.), a uniformly black molded test piece with good appearance and surface gloss [48×86×3 (mm)] was obtained. Appearance and surface gloss were evaluated in the same manner as in Example 1; the results are shown in Table 2.

Comparative Example 3

In the same manner as in Example 1, except that the black dye of Production Example 1 was replaced with Spirit Black SB (trade name for nigrosine produced by Orient Chemical Industries Ltd.), a uniformly black molded test piece with good appearance and surface gloss [48×86×3 (mm)] was obtained. Appearance and surface gloss were evaluated in the same manner as in Example 1; the results are shown in Table 2.

Comparative Example 4

In the same manner as in Example 1, except that the black dye of Production Example 1 was replaced with Carbon Black, an ununiformly black molded test piece [48×86×3 (mm)] was obtained. Appearance and surface gloss were evaluated in the same manner as in Example 1; the results are shown in Table 2.

TABLE 2
Evaluation of Appearance and Surface Gloss

|  | Coloring agent | Appearance | Surface glossiness |
| --- | --- | --- | --- |
| Example 1 | Production Example 1 | ◎ | 97.3 |
| Example 2 | Production Example 3 | ◎ | 97.7 |
| Example 3 | Production Example 5 | ◎ | 97.3 |
| Example 4 | Production Example 6 | ◎ | 97.2 |
| Example 5 | Production Example 7 | ◎ | 97.5 |
| Comparative Example 1 | Original resin | ◎ | 97.6 |
| Comparative Example 2 | Spirit Black AB | ◎ | 98.2 |
| Comparative Example 3 | Spirit Black SB | ◎ | 98.4 |
| Comparative Example 4 | Carbon black | X | 82.7 |

In Examples 6 to 18 and Comparative Examples 5 to 8, colored pellets (2 mm diameter×2 mm) were prepared and crystallizing temperature differences were determined using a differential scanning calorimeter.

Example 6

1000 g of a polyamide resin (produced by Dupont, trade name: Zytel 101L-NC10) and 30 g of the black dye of Production Example 1 were placed in a stainless steel tumbler and stirred vigorously for 20 minutes.

This mixture was kneaded in a molten state at 270° C. using a vent-type extruder (produced by Enpura Sangyo, trade name: E30SV) and treated by a conventional method to yield uniformly colored pellets with good appearance and surface gloss (2 mm diameter×2 mm), which were vacuum-dried at 120° C. for 6 hours.

In accordance with JIS K7121, these pellets were cut as appropriate for the inside shape of the measuring cell of a differential scanning calorimeter (produced by Seiko Denshi Kogyo, trade name: DSC6100), evenly housed therein, and immobilized with a cover placed thereon. A DSC curve obtained by measuring the melting point and crystallizing temperature of the pellets using the differential scanning calorimeter is shown in FIG. 1.

Measuring Conditions for Differential Scanning Calorimetry (DSC)

The sample was heated from room temperature to 300° C. at a rate of 20° C./minute and the peak melting temperature was determined. After the temperature was kept constant at 300° C. for 3 minutes, the sample was cooled to room temperature at a rate of 10° C./minute, and the extrapolated crystallization initiation temperature ($T_{IC}$), peak crystallizing temperature and extrapolated crystallization ending temperature ($T_{EC}$) were determined.

Taking the peak melting temperature as melting point ($T_{PM}$), the peak crystallizing temperature as crystallizing temperature ($T_{PC}$), and the crystallizing temperature of the resin containing no black compound (original resin) as $T^O{}_{PC}$, the crystallizing temperature difference $\Delta T_{PC}$ is expressed as the difference between the crystallizing temperature $T^O{}_{PC}$ of original resin and the crystallizing temperature $T_{PC}$ of the colored resin composition, i.e., $\Delta T_{PC} = T^O{}_{PC} - T_{PC}$.

Crystallizing temperature difference $\Delta T_{PC} = T^O{}_{PC}$(crystallizing temperature of original resin)$-T_{PC}$(crystallizing temperature of colored resin composition)

As determined by DSC, the melting points, extrapolated crystallization initiation temperatures, crystallizing temperatures and extrapolated crystallization ending temperatures, and crystallizing temperature differences from the original resin are shown in Table 3.

Examples 7 to 18 and Comparative Examples 5 to 8

In the same manner as in Example 6, dried pellets were obtained. In Examples 7 to 18 and Comparative Examples 6 to 8, however, the black dye of Production Example 1 used in Example 6 was replaced with each black dye or black pigment shown in Table 2. In Comparative Example 5, the original resin not containing the black dye of Production Example 1 used in Example 6 was used.

Figure 2:
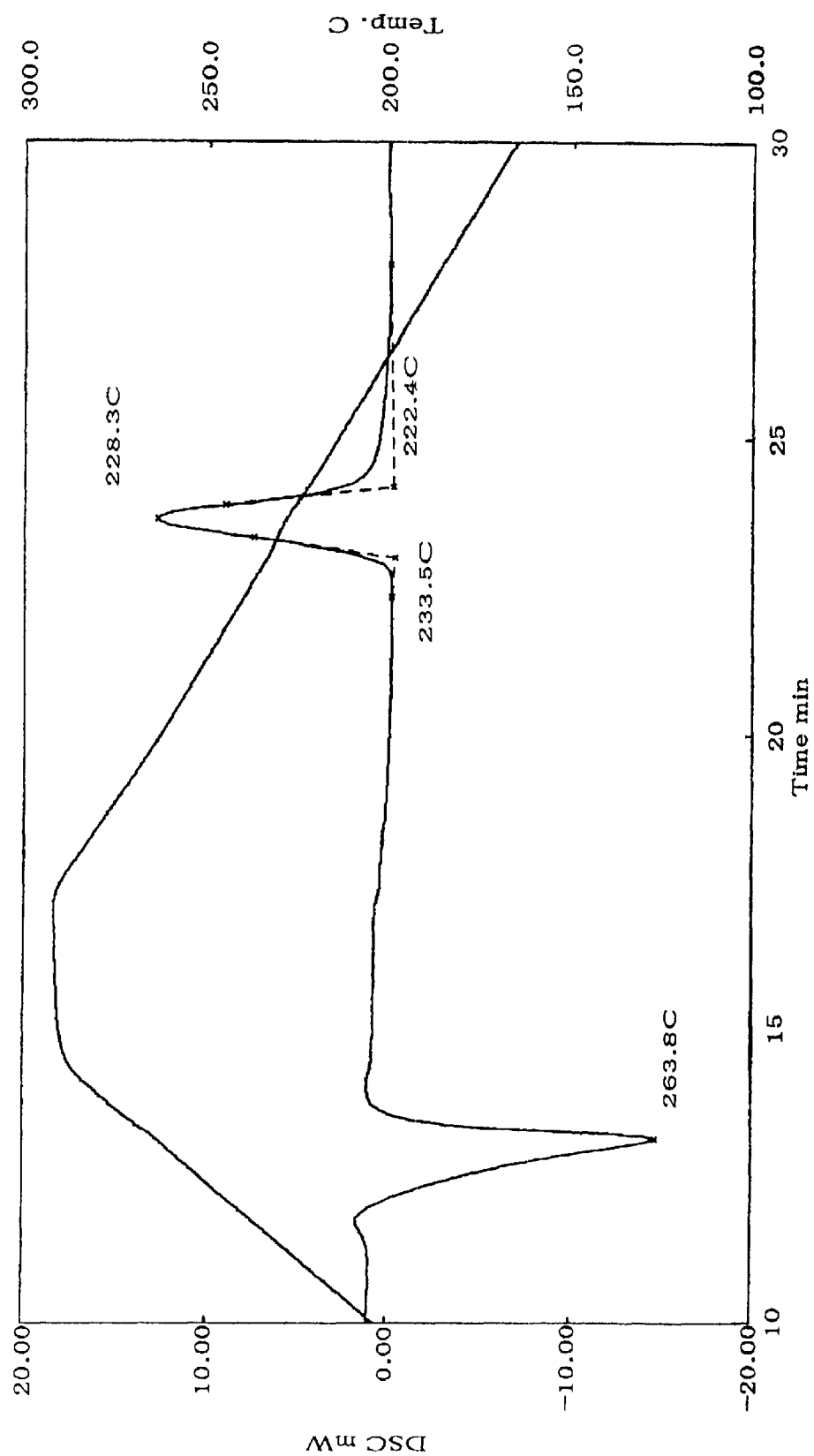
FIG. 2 shows a DSC curve obtained in Comparative Example 5.
Figure 3:
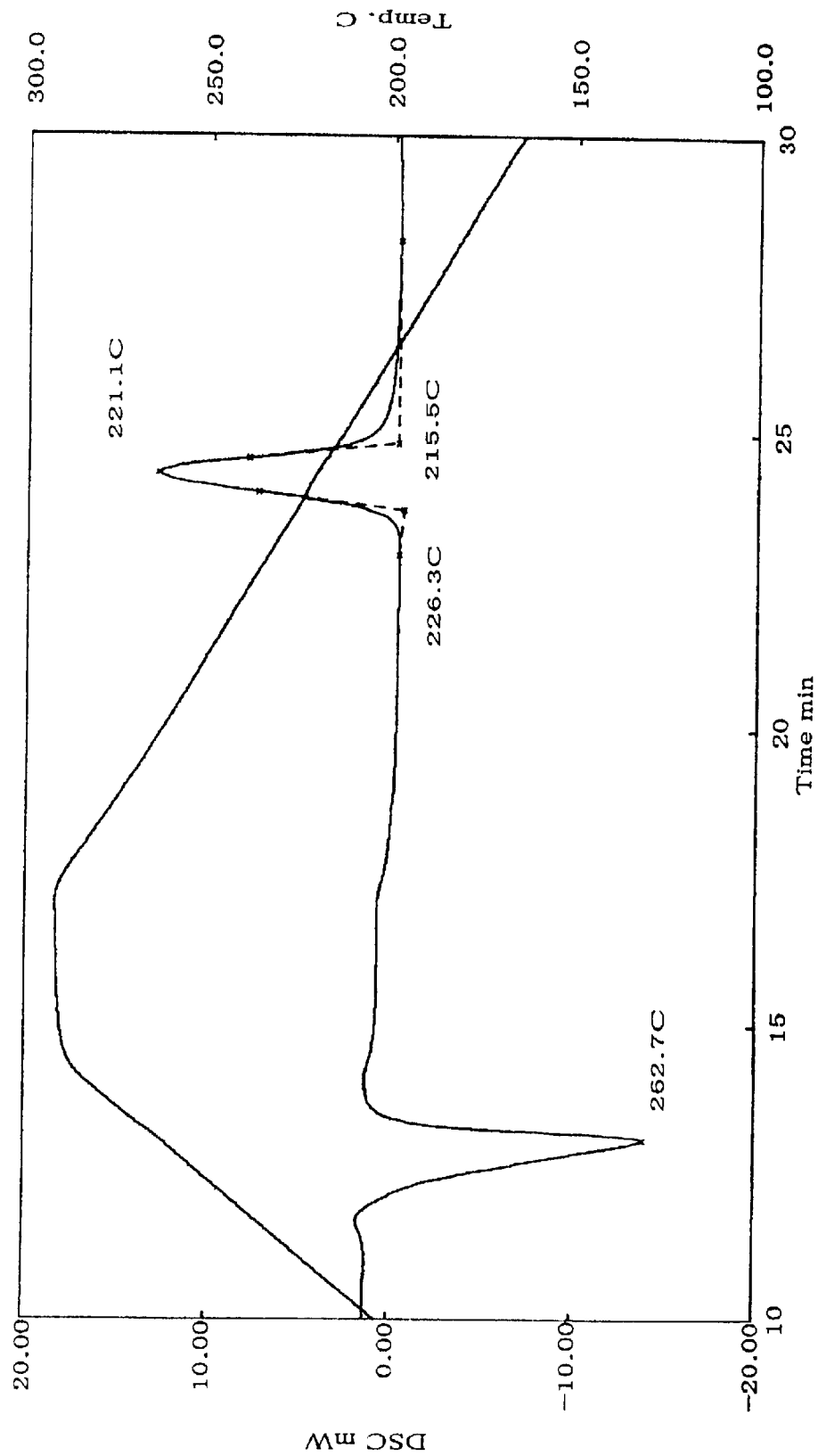
FIG. 3 shows a DSC curve obtained in Comparative Example 6.

Each sample was subjected to differential scanning calorimetry in the same manner as in Example 6. The melting points, extrapolated crystallization initiation temperatures, crystallizing temperatures and extrapolated crystallization ending temperatures, and crystallizing temperature differences from the original resin are shown in Table 3. A DSC curve obtained in Comparative Example 5 and a DSC curve obtained in Comparative Example 6 are shown in FIGS. 2 and 3, respectively.

TABLE 3

|  | Coloring agent | Test for comparing crystallizing temperatures | | | | |
| --- | --- | --- | --- | --- | --- | --- |
|  |  | $T_{PM}$ °C. | $T_{1C}$ °C. | $T_{PC}$ °C. | $T_{EC}$ °C. | $\Delta T_{PC}$ °C. |
| Example 6 | Production Example 1 | 261.0 | 222.5 | 209.5 | 202.0 | 18.8 |
| Example 7 | Production Example 2 | 261.6 | 226.9 | 209.0 | 202.7 | 19.3 |
| Example 8 | Production Example 3 | 261.0 | 221.0 | 207.9 | 200.2 | 20.4 |
| Example 9 | Production Example 4 | 262.2 | 214.5 | 209.7 | 204.0 | 18.6 |
| Example 10 | Production Example 5 | 261.9 | 221.2 | 208.0 | 199.5 | 20.3 |

TABLE 3-continued

|  | Coloring agent | Test for comparing crystallizing temperatures | | | | |
|---|---|---|---|---|---|---|
|  |  | $T_{PM}$ °C. | $T_{1C}$ °C. | $T_{PC}$ °C. | $T_{EC}$ °C. | $\Delta T_{PC}$ °C. |
| Example 11 | Production Example 6 | 263.0 | 222.1 | 210.1 | 200.3 | 18.2 |
| Example 12 | Production Example 7 | 262.8 | 214.8 | 204.9 | 197.6 | 23.4 |
| Example 13 | Production Example 8 | 261.5 | 218.8 | 211.1 | 204.3 | 17.2 |
| Example 14 | Production Example 9 | 261.8 | 220.4 | 210.3 | 202.1 | 18.0 |
| Example 15 | Production Example 10 | 262.2 | 215.4 | 209.5 | 203.5 | 18.8 |
| Example 16 | Production Example 11 | 262.3 | 219.1 | 208.9 | 199.8 | 19.4 |
| Example 17 | Production Example 12 | 261.0 | 220.8 | 210.0 | 201.3 | 18.3 |
| Example 18 | Production Example 13 | 262.5 | 217.9 | 210.2 | 203.1 | 18.1 |
| Comparative Example 5 | Original resin | 263.8 | 233.5 | 228.3 | 222.4 | 0.0 |
| Compartive Example 6 | Spirit Black AB | 262.7 | 226.3 | 221.1 | 215.5 | 7.2 |
| Comparative Example 7 | Carbon black | 262.2 | 239.2 | 234.9 | 229.1 | −6.6 |
| Comparative Example 8 | Aniline black | 263.0 | 231.0 | 225.6 | 218.8 | 2.7 |

In Table 3, $T^0{}_{PC}$° C. is given in the column for $T_{PC}$° C. of the original resin of Comparative Example 5.

Examples 19 to 23, 24 and Comparative Examples 9 to 13 concern the black polyamide resin compositions fiber-reinforced by containing glass fiber.

In Examples 19 through 21 and Comparative Examples 9 and 10, colored molded test pieces [48×86×3 (mm)] were prepared and their appearance and surface gloss were evaluated and measured.

Example 19

500 g of a fiber-reinforced polyamide resin (produced by Dupont, trade name: 70G-33L) and 15 g of the black dye of Production Example 1 were placed in a stainless steel tumbler and stirred vigorously for 1 hour.

This mixture was kneaded in a molten state at 300° C. using a vent-type extruder (produced by Enpura Sangyo, trade name: E30SV) and treated by a conventional method to yield colored pellets, which were vacuum-dried at 120 for 6 hours.

After pellet drying, a test piece was prepared at 280 to 300° C. by an ordinary method using an injection-molding machine (produced by Kawaguchi Tekko, trade name: KM-50C). A bluish black molded test piece with good compatibility between the resin and the dye [48×86×3 (mm)] was obtained. The results of evaluation and measurement of the appearance and surface gloss of this molded test piece are shown in Table 4.

Examples 20 and 21

In the same manner as in Example 19, except that the black dye of Production Example 1 was replaced with each black dye shown in Table 4, a uniformly and vividly black molded test piece [48×86×3 (mm)] was obtained. The results of evaluation and measurement of the appearance and surface gloss of this molded test piece are shown in Table 4.

Comparative Example 9

In the same manner as in Example 19, except that the black dye of Production Example 1 was replaced with Spirit Black AB (trade name for nigrosine produced by Orient Chemical Industries Ltd.), a black molded test piece with bad surface gloss [48×86×3 (mm)] was obtained. The results of evaluation and measurement of the appearance and surface gloss of this molded test piece are shown in Table 4.

Comparative Example 10

In the same manner as in Example 19, except that the black dye of Production Example 1 was replaced with Carbon Black, a black molded test piece with bad surface gloss [48×86×3 (mm)] was obtained. The results of evaluation and measurement of the appearance and surface gloss of this molded test piece are shown in Table 4.

TABLE 4

Evaluation of Appearance and Surface Gloss

| | Coloring agent | Appearance | Surface glossiness |
|---|---|---|---|
| Example 19 | Production Example 1 | ⊙ | 84 |
| Example 20 | Production Example 2 | ○ | 76 |
| Example 21 | Production Example 5 | ⊙ | 87 |
| Comparative Example 9 | Spirit Black AB | Δ | 60 |
| Comparative Example 10 | Carbon black | X | 50 |

In Examples 22 and 23 and Comparative Examples 11 to 13, colored pellets (2 mm diameter×2 mm) were prepared and crystallizing temperature differences were determined using a differential scanning calorimeter.

Example 22

1000 g of a fiber-reinforced polyamide resin (produced by Dupont, trade name: 70G-33L) and 30 g of the black dye of Production Example 1 were placed in a stainless steel tumbler and stirred vigorously for 20 minutes.

This mixture was kneaded in a molten state at 270° C using a vent-type extruder (produced by Enpura Sangyo, trade name: E30SV) and treated by a conventional method to yield uniformly colored pellets with good appearance and surface gloss (2 mm diameter×2 mm), which were vacuum-dried at 120° C. for 6 hours.

Figure 4:
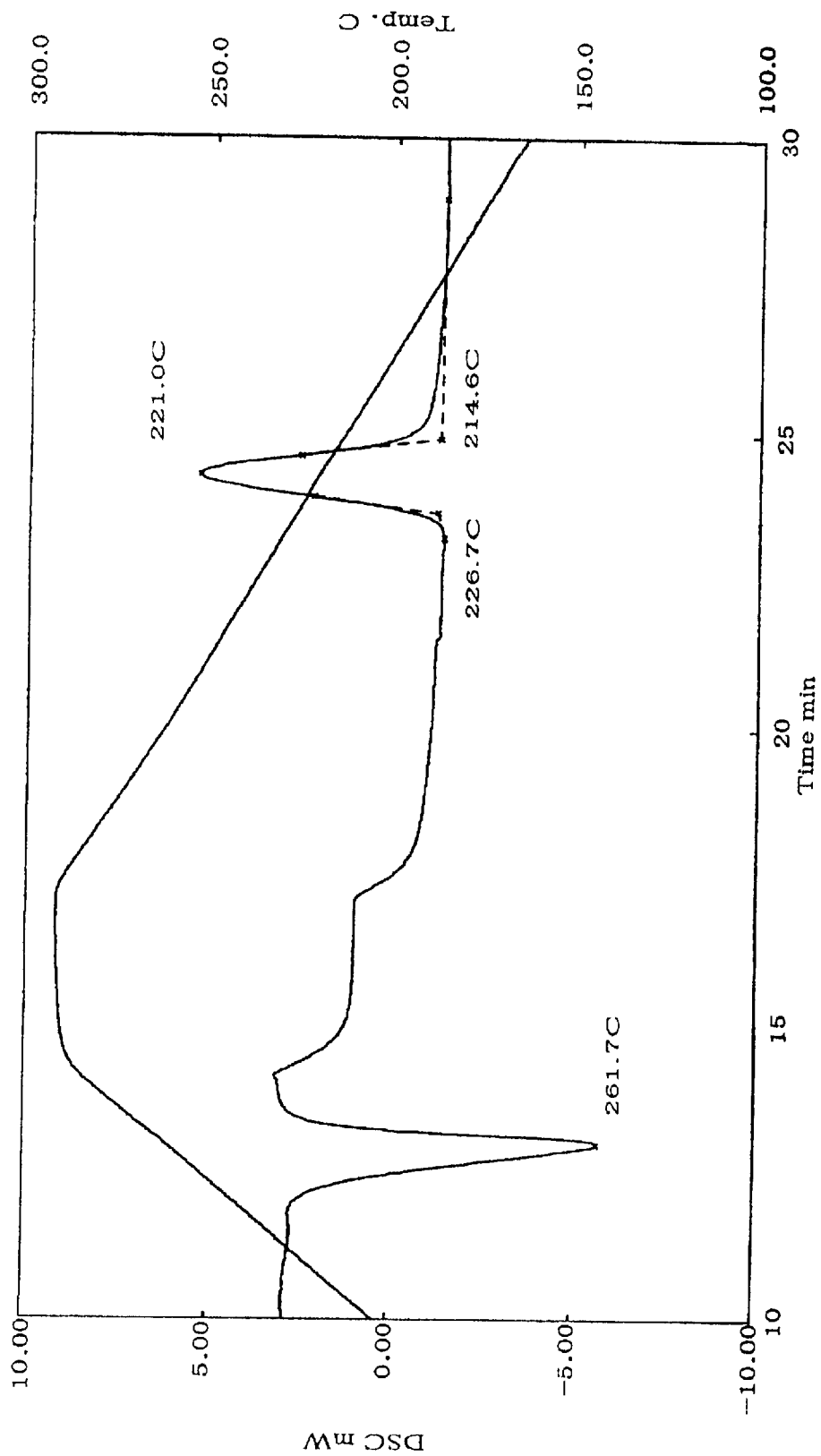
FIG. 4 shows a DSC curve obtained in Example 22.

In accordance with JIS K7121, the melting point and crystallizing temperature of these pellets were determined in the same manner as Example 6. A DSC curve obtained by this measurement is shown in FIG. 4.

Example 23 and Comparative Examples 11 to 13

In the same manner as in Example 22, colored pellets were obtained. In Example 23 and Comparative Examples 12 and 13, however, the black dye of Production Example 1 used in Example 22 was replaced with each black dye or black pigment shown in Table 5. In Comparative Example 11, the original resin not containing the black dye of Production Example 1 used in Example 22 was used.

Figure 5:
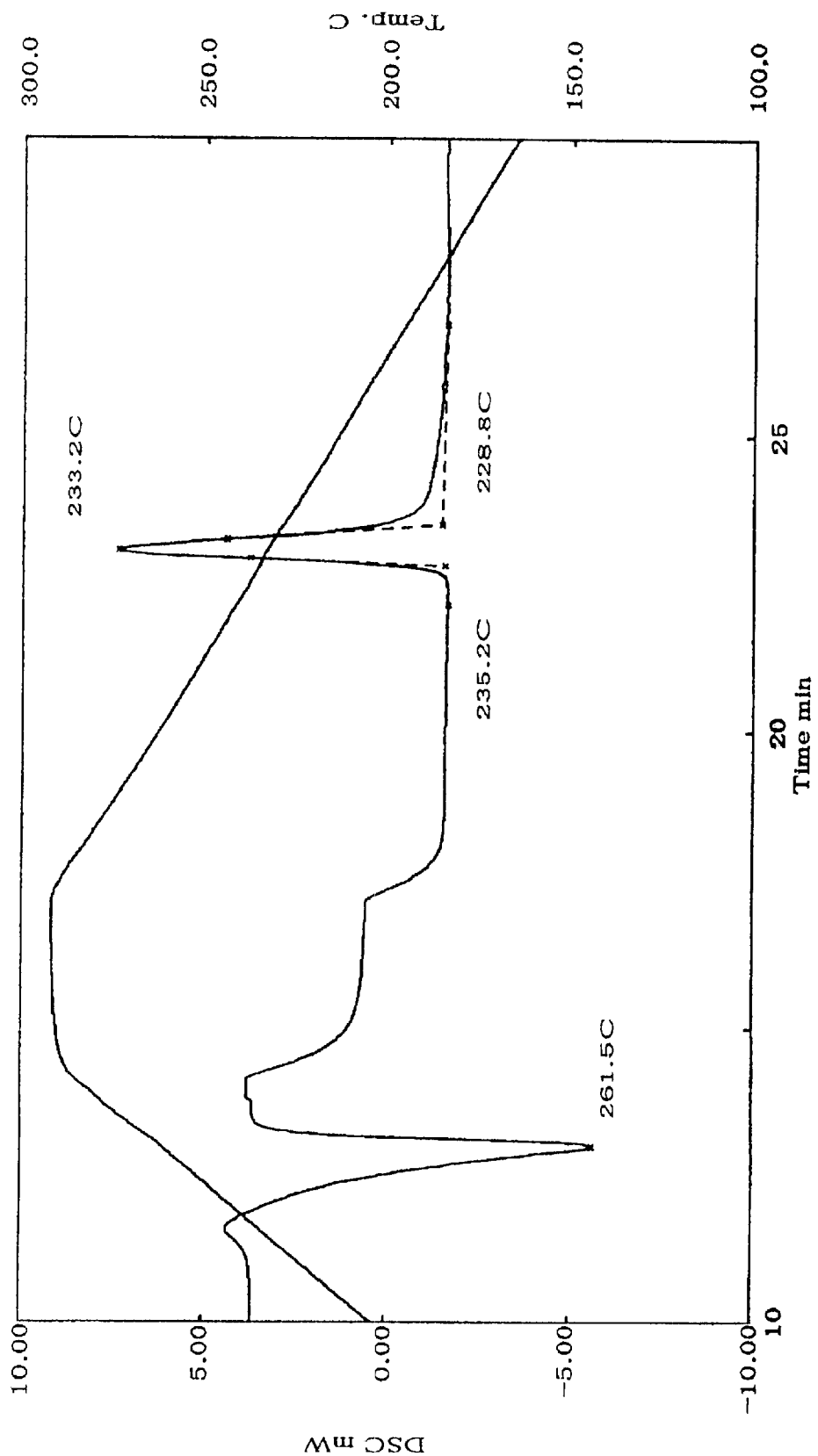
FIG. 5 shows a DSC curve obtained in Comparative Example 11.

The melting point and crystallizing temperature of the pellets were determined in accordance with JIS K7121, using a differential scanning calorimeter in the same manner as in Example 6. A DSC curve obtained by this measurement in Comparative Example 11 is is shown in FIG. 5.

Example 24

Test Comparing Surface Glossiness of Various Fiber-reinforced Molded Test Pieces Obtained at Different Mold Temperatures and Injection Times in Molding Using a fiber-reinforced polyamide resin and 30 g of each black dye shown in Table 6, dried colored pellets were obtained in the same manner as in Example 19. Using the polyamide resin without any black dye (original resin), dried pellets were obtained in the same manner as in Example 19.

Using an injection molding machine (produced by Kawaguchi Tekko, trade name: KM-50C) at each mold temperature and injection time shown in Table 6, molded test pieces [48×86×3 (mm)] were obtained. The results of measurement of the surface glossiness of these molded test pieces are shown in Table 6.

The aforementioned mold temperature is the temperature of a mold for cooling and solidifying a molten resin filled therein.

The aforementioned injection time is a period of time during which a pressure is exerted on the screw (period of time during which a pressure is exerted on the resin being injected), including the times required for resin fluidization, cavity filling, and pressure maintenance.

TABLE 5

| | | Test for comparing crystallizing temperatures | | | | |
|---|---|---|---|---|---|---|
| | Coloring agent | $T_{PM}$ ° C. | $T_{1C}$ ° C. | $T_{PC}$ ° C. | $T_{EC}$ ° C. | $\Delta T_{PC}$ ° C. |
| Example 22 | Production Example 1 | 262.0 | 226.7 | 221.0 | 214.6 | 12.2 |
| Example 23 | Production Example | 261.8 | 225.2 | 218.8 | 212.9 | 14.4 |
| Comparative Example 11 | Original resin | 261.4 | 235.2 | 233.2 | 228.8 | 0.0 |
| Comparative Example 12 | Spirit Black AB | 259.7 | 229.4 | 225.5 | 220.0 | 7.7 |
| Comparative Example 13 | Spirit Black SB | 259.1 | 228.8 | 224.9 | 219.3 | 8.3 |

In Table 5, $T^0_{PC}$° C. is given in the column for $T_{PC}$°C of the original resin of Comparative Example 11.

TABLE 6

Relationship between Mold Temperature and Injection Time in Molding versus Surface Glossiness of Molded Test Piece

| Mold temperature | 105 | | | 95 | | | 85 | | |
|---|---|---|---|---|---|---|---|---|---|
| Injection time second | 0.6 | 1.2 | | 0.6 | 1.2 | | 0.6 | 1.2 | |
| Coloring agent | Surface glossiness | | non-dependency rate | Surface glossiness | | non-dependency rate | Surface glossiness | | non-dependency rate |
| Production Example 1 | 80 | 65 | 81 | 84 | 70 | 84 | 82 | 60 | 72 |

TABLE 6-continued

Relationship between Mold Temperature and Injection Time in Molding versus Surface Glossiness of Molded Test Piece

| Production Example 5 | 84 | 67 | 80 | 87 | 74 | 85 | 86 | 71 | 82 |
|---|---|---|---|---|---|---|---|---|---|
| Original resin | 52 | 22 | 42 | 64 | 23 | 36 | 51 | 24 | 46 |
| Spirit Black | 81 | 58 | 72 | 82 | 60 | 72 | 82 | 55 | 67 |

In Table 6, the non-dependency rate is defined as the ratio of the surface glossiness obtained at an injection time of 1.2 seconds to the surface glossiness obtained at an injection time of 0.6 seconds; as the non-dependency rate increases, the surface glossiness of the molded product is less affected by injection time.

From Table 6, it is evident that the surface glossiness of a molded product using the colored thermoplastic resin composition of the present invention is less affected by mold temperature and injection time than a molded product using a thermoplastic resin composition colored with conventional nigrosine and a molded product using the original resin.

Example 25 and Comparative Example 14 concern black polybutylene terephthalate resin compositions not containing a fibrous reinforcing material.

Example 25

500 g of a polybutylene terephthalate resin (produced by Dupont, trade name: PBT400) and 15 g of the black dye of Production Example 1 were placed in a stainless steel tumbler and stirred vigorously for 1 hour.

This mixture was kneaded in a molten state at 250° C. using a vent-type extruder (produced by Enpura Sangyo, trade name: E30SV) and treated by a conventional method to yield colored pellets, which were vacuum-dried at 120° C. for 6 hours. In accordance with JIS K7121, these pellets were subjected to differential scanning calorimetry in the same manner as in Example 6 to determine their melting point and crystallizing temperature. The results are shown in Table 7.

Comparative Example 14

Using the original resin without the black dye of Production Example 1, dry pellets were prepared in the same manner as in Example 25. In accordance with JIS K7121, these pellets were subjected to differential scanning calorimetry in the same manner as in Example 6 to determine their melting point and crystallizing temperature. The results are shown in Table 7.

TABLE 7

Test for comparing crystallizing temperatures

| | Coloring agent | $T_{PM}$ ° C. | $T_{1C}$ ° C. | $T_{PC}$ ° C. | $T_{EC}$ ° C. | $\Delta T_{PC}$ ° C. |
|---|---|---|---|---|---|---|
| Example 25 | Production Example 1 | 224.4 | 179.6 | 173.4 | 167.6 | 15.6 |
| Comparative Example 14 | Original resin | 224.1 | 193.9 | 189.0 | 183.4 | 0.0 |

What is claimed is:

1. Colored thermoplastic resin composition comprising a crystalline thermoplastic resin containing a black dye and a fibrous reinforcing material, wherein said black dye is a black dye obtainable by a reaction of one or more anionic surfactants selected from the group consisting of (a) to (d) below and nigrosine, and wherein the crystallizing temperature is lower than that of the original thermoplastic resin containing no black dye;

(a) a sulfuric acid ester surfactant
(b) a phosphoric acid ester surfactant
(c) a sulfonic acid surfactant
(d) a carboxylic acid surfactant.

2. Colored thermoplastic resin composition of claim 1 wherein said sulfuric acid ester surfactant is one or more surfactants selected from the group consisting of an alkyl sulfuric acid ester or a salt thereof,
an alkyl ether sulfuric acid ester or a salt thereof,
polyoxyethylene ether sulfuric acid ester or a salt thereof,
a polyoxyethylene alkyl ether sulfuric acid ester or a salt thereof,
a polyoxyethylene aryl ether sulfuric acid ester or a salt thereof, and
an alkylamide sulfuric acid ester or a salt thereof.

3. Colored thermoplastic resin composition of claim 1 wherein said phosphoric acid ester surfactant is one or more surfactants selected from the group consisting of an alkyl phosphoric acid ester or a salt thereof,
a polyoxyethylene ether phosphoric acid ester or a salt thereof,
a polyoxyethylene alkyl ether phosphoric acid ester or a salt thereof, and
a polyoxyethylene aryl ether phosphoric acid ester or a salt thereof.

4. Colored thermoplastic resin composition of claim 1 wherein said sulfonic acid surfactant is one or more surfactants selected from the group consisting of an alkylbenzenesulfonic acid or a salt thereof,
an alkylnaphthalenesulfonic acid or a salt thereof,
a naphthalenesulfonic acid salt-formalin polycondensation product,
a sulfosuccinic acid or a salt thereof,
α-olefinsulfonic acid or a salt thereof, and
N-acylsulfonic acid or a salt thereof.

5. Colored thermoplastic resin composition of claim 1 wherein said carboxylic acid surfactant is one or more surfactants selected from the group consisting of
   a polyoxyethylene ether carboxylic acid or a salt thereof,
   a polyoxyethylene alkyl ether carboxylic acid or a salt thereof,
   an N-acylamino acid or a salt thereof,
   a naphthenic acid or a salt thereof,
   an aliphatic amine and aliphatic amide fatty acid or a salt thereof,
   an aliphatic amine and aliphatic amide aromatic carboxylic acid or a salt thereof, and
   a polycarboxylic acid type high molecular compound or a salt thereof.

6. Colored thermoplastic resin composition of claim 1, 2, 3, 4 or 5 wherein said black dye is contained at 0.1 to 10% by weight per 100% by weight of said thermoplastic resin.

7. Colored thermoplastic resin composition of claim 1, 2, 3, 4 or 5 whose crystallizing temperature is lower by not less than 5° C. than that of a thermoplastic resin composition containing nigrosine instead of said black dye.

8. Colored thermoplastic resin composition of claim 1, 2, 3, 4 or 5 whose crystallizing temperature is lower by not less than 10° C. than that of the original thermoplastic resin not containing said black dye.

9. Colored thermoplastic resin composition of claim 1, 2, 3, 4 or 5 wherein said crystalline thermoplastic resin is polyamide resin, polybutylene terephthalate resin or polyphenylene sulfide resin.

10. Method for lowering the crystallizing temperature of a thermoplastic resin, in comparison with the original thermoplastic resin not containing a black dye, by containing a black dye in a crystalline thermoplastic resin, wherein said black dye is a black dye obtainable by a reaction of one or more anionic surfactants selected from the group consisting of (a) to (d) below and nigrosine,
   (a) a sulfuric acid ester surfactant
   (b) a phosphoric acid ester surfactant
   (c) a sulfonic acid surfactant
   (d) a carboxylic acid surfactant.

11. Method for injection-molding a colored thermoplastic resin composition comprising a crystalline thermoplastic resin containing a black dye, wherein said black dye is a black dye obtainable by a reaction of one or more anionic surfactants selected from the group consisting of (a) to (d) below and nigrosine, and wherein the mold temperature for said injection molding is 50 to 120° C.,
   (a) a sulfuric acid ester surfactant
   (b) a phosphoric acid ester surfactant
   (c) a sulfonic acid surfactant
   (d) a carboxylic acid surfactant.

12. Fiber-reinforced colored thermoplastic resin molded product comprising a crystalline thermoplastic resin containing a fibrous reinforcing material and a black dye, wherein said black dye is a black dye obtainable by a reaction of one or more anionic surfactants selected from the group consisting of (a) to (d) below and nigrosine, and whose surface glossiness is higher than that of a fiber-reinforced colored thermoplastic resin molded product containing nigrosine instead of said black dye,
   (a) a sulfuric acid ester surfactant
   (b) a phosphoric acid ester surfactant
   (c) a sulfonic acid surfactant
   (d) a carboxylic acid surfactant.

13. Colored thermoplastic resin composition for molding comprising a crystalline thermoplastic resin containing a black dye, wherein said black dye is a black dye obtainable by a reaction of one or more anionic surfactants selected from the group consisting of (a) to (d) below and nigrosine, and wherein the crystallizing temperature is lower than that of the original thermoplastic resin containing no black dye,
   (a) a sulfuric acid ester surfactant
   (b) a phosphoric acid ester surfactant
   (c) a sulfonic acid surfactant
   (d) a carboxylic acid surfactant.

14. Colored thermoplastic resin composition comprising a crystalline thermoplastic resin containing a black dye, wherein said black dye is a black dye obtainable by a reaction of one or more anionic surfactants selected from the group consisting of (a) to (d) below and nigrosine, said crystalline thermoplastic resin is one or more thermoplastic resins selected from the group consisting of polyamide resin, polyethylene resin, polyphenylene sulfide resin and polyether ether ketone resin, and wherein the crystallizing temperature is lower than that of the original thermoplastic resin containing no black dye,
   (a) a sulfuric acid ester surfactant
   (b) a phosphoric acid ester surfactant
   (c) a sulfonic acid surfactant
   (d) a carboxylic acid surfactant.

15. Fiber-reinforced colored thermoplastic resin molded product of claim 12 whose surface glossiness is not less than 70.

* * * * *